T. M. Scott,
Fly Trap,
Nº 19,382. Patented Feb. 16, 1858.
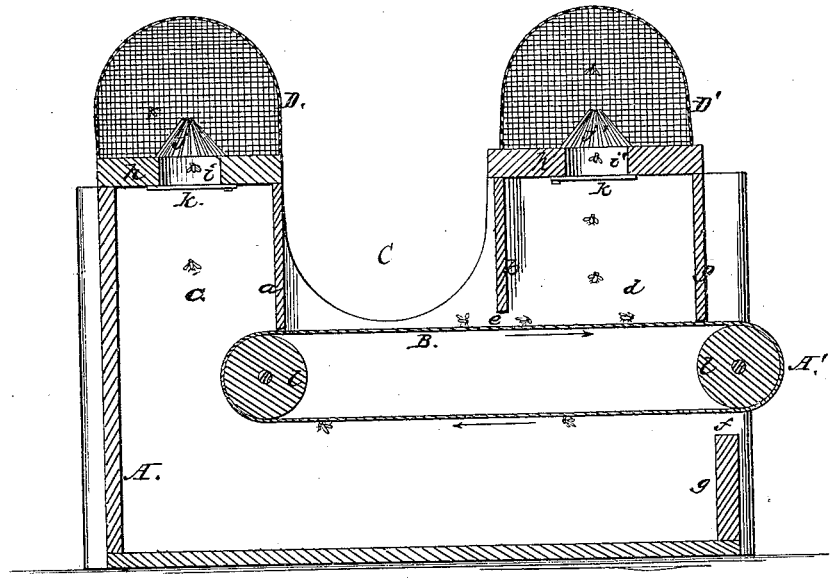

UNITED STATES PATENT OFFICE.

THOS. M. SCOTT, OF LAGRANGE, GEORGIA.

FLY-TRAP.

Specification of Letters Patent No. 19,382, dated February 16, 1858.

*To all whom it may concern:*

Be it known that I, THOS. M. SCOTT, of Lagrange, in the county of Troup and State of Georgia, have invented a new and Improved Fly-Trap; and I do hereby declare that the following is a full, clear, and exact description of the same, reference being had to the annexed drawings, making a part of this specification, said drawing being a vertical central section of my improvement.

My invention relates to that description of fly-traps in which an endless belt is used; and my improvement consists in a special arrangement of parts, whereby two distinct places and chambers are presented for the gathering of the insects, as will be hereinafter shown.

I disclaim the invention or employment of the endless belt in fly-traps, as it is suggested in Fuller and Pierce's patent, April 16th, 1850.

To enable those skilled in the art to fully understand and construct my invention, I will proceed to describe it.

A, represents a quadrilateral box or case in which an endless apron B, is placed longitudinally. This apron may be constructed of cloth and one end projects through the box a short distance as shown clearly at $A^1$, in the drawing. The upper part of the box A, has a recess or opening C, formed in it so as to expose a portion of the upper surface of the apron B; the side pieces $(a)$, $(b)$, closing the upper part of the box and forming two chambers $(c)$ $(d)$ above the level of the apron. The side piece $(a)$ extends down to the upper surface of the apron, but the side piece $(b)$ does not quite reach the apron. a space $(e)$ being allowed between its lower edge and the apron. A space $(f)$ is also allowed between the lower surface of the apron and the end piece $(g)$ of the box below the apron; but the lower end of the upper part of the end piece $(g)$ extends down to the upper surface of the apron.

On the upper parts of the chambers $(c)$ $(d)$, fly-receptacles D, $D^1$, are placed. These receptacles are constructed of wire-gauze, bent in semi-cylindrical form, provided with wire-gauze ends, and attached to wooden bottoms $(h)$, which have openings $(i)$ $(i^1)$ made through them; and wire rods $(j)$ $(j^1)$ are placed over the openings in conical form. A slide $(k)$ is attached to the under side of each bottom $(h)$ for the purpose of closing the openings $(i)$ $(i^1)$, when necessary. The apron B works over suitable rollers $(l)$, $(l)$, and the shaft or axis of the innermost roller $(l)$ may be attached to a clock movement, so that the apron may be moved in the direction of the arrow. The apron B has honey, moistened sugar or some other sweet substance placed upon it; and as the apron moves as indicated, the flies, attracted by the bait, will alight upon the apron at the places where it is exposed, viz., at the recess C, and the end $A^1$, which projects through the end of the box. When the flies alight on the apron exposed by the recess C, they will be carried through the space $(e)$ into the chamber $(d)$, but will be prevented from passing out of said chamber by the lower end of the end-piece $(g)$; and the flies, attracted by the light above, will naturally fly upward through the opening $(i^1)$ into the receptacle $D^1$; the rods $(j^1)$ serving as a guard to prevent the return of the flies. When the flies alight on the end $A^1$, of the apron that projects through the end of the box, they are carried through the space $(f)$ and around through the box A into the chamber $(c)$; the partition $(a)$ preventing their egress from said chamber; and the flies will then pass upward through the opening $(i)$ into the receptacle D.

The receptacles may be removed from the tops of the chambers $(c)$, $(d)$, when necessary, the flies being then destroyed, and the receptacles replaced; the slides $(k)$ being adjusted so as to close the openings when the receptacles are removed.

This device has been practically tested, and it operates well; the flies are conveyed into two receptacles at the same time; the device is simple, and it may be afforded at a reasonable cost.

Having thus described my invention, what I claim as new, and desire to secure by Letters Patent, is:—

The arrangement of the recess C, end $A^1$, spaces $(e, f)$, chambers $(c, d)$, end-piece $(g)$ openings $(i, i^1)$, receptacles D, $D^1$, box A, and partition $(a)$, all as described; whereby the catching and retaining capacity of the contrivance is doubled without any augmentation of the driving power and with little or no increased expense in construction.

THOS. M. SCOTT.

Witnesses:
BENJAMIN H. BIGHAM,
W. W. HUGHES.